US009721121B2

(12) United States Patent
O'Dowd et al.

(10) Patent No.: US 9,721,121 B2
(45) Date of Patent: Aug. 1, 2017

(54) OUT-OF-BAND SPY DETECTION AND PREVENTION FOR PORTABLE WIRELESS SYSTEMS

(71) Applicant: Green Hills Software, Inc., Santa Barbara, CA (US)

(72) Inventors: Daniel O'Dowd, Santa Barbara, CA (US); David Kleidermacher, Santa Barbara, CA (US); Thomas Cantrell, Oxnard, CA (US); Dennis Kou, Goleta, CA (US); Daniel Hettena, Princeton, NJ (US)

(73) Assignee: Green Hills Software, Inc., Santa Barbara, CA (US)

( * ) Notice: Subject to any disclaimer, the term of this patent is extended or adjusted under 35 U.S.C. 154(b) by 16 days.

(21) Appl. No.: 14/305,829

(22) Filed: Jun. 16, 2014

(65) Prior Publication Data

US 2015/0363613 A1 Dec. 17, 2015

(51) Int. Cl.
*G06F 21/82* (2013.01)
*G06F 21/53* (2013.01)

(52) U.S. Cl.
CPC .................... *G06F 21/82* (2013.01)

(58) Field of Classification Search
CPC ........ G06F 21/82; G06F 21/53; G06F 21/554; G06F 2221/2149; G06F 2221/031; G06F 2221/2101
See application file for complete search history.

(56) References Cited

U.S. PATENT DOCUMENTS

| 8,489,846 B1* | 7/2013 | Jensen | G06F 21/74 |
| | | | 711/173 |
| 8,612,633 B2 | 12/2013 | Cleeton et al. | |
| 8,683,575 B2 | 3/2014 | Meketa | |

(Continued)

OTHER PUBLICATIONS

PCT International Search Report dated Nov. 3, 2015 of International Application No. PCT/US15/35901. 24 Pages.

*Primary Examiner* — Amir Mehrmanesh
(74) *Attorney, Agent, or Firm* — Barceló, Harrison & Walker, LLP (57) ABSTRACT

Certain embodiments employ an "out-of-band" mechanism to remove the physical controls for activating input peripherals from a portable device operating system and instead controlled by a separate peripheral control domain, isolated from the operating system domain by a machine virtualization/isolation technology. No additional hardware may be required. An adjunct I/O virtualization mechanism may also be included to abstract the guarded input peripheral interfaces, such that all attempts to turn them on from within the operating system are automatically redirected by the I/O virtualization mechanism to the peripheral control domain. The peripheral control domain may then conduct a policy-driven decision process to either allow, disallow, or request manual/explicit authorization of an access attempts. Physical access may be performed within the peripheral control domain. Because the access control and physical activation of input peripherals occur out-of-band from the operating system, these security-critical operations may be immune to vulnerabilities in the portable operating system.

76 Claims, 2 Drawing Sheets

(56) References Cited

U.S. PATENT DOCUMENTS

| | | | |
|---|---|---|---|
| 8,866,698 B2* | 10/2014 | Ortega | G06F 3/1438 345/1.1 |
| 2003/0110336 A1* | 6/2003 | Park | G06F 13/24 710/260 |
| 2007/0078683 A1 | 4/2007 | Grajales et al. | |
| 2010/0325720 A1 | 12/2010 | Etchegoyen et al. | |
| 2011/0252459 A1 | 10/2011 | Walsh et al. | |
| 2012/0054486 A1 | 3/2012 | Lakkavalli et al. | |
| 2012/0320842 A1 | 12/2012 | Jeong et al. | |
| 2013/0238169 A1 | 9/2013 | Hannah et al. | |
| 2013/0332924 A1 | 12/2013 | Shaposhnik et al. | |
| 2014/0044265 A1 | 2/2014 | Kocher et al. | |

* cited by examiner

Figure 1

FIG. 2

OUT-OF-BAND SPY DETECTION AND PREVENTION FOR PORTABLE WIRELESS SYSTEMS

BACKGROUND OF THE DISCLOSURE

1. Field of the Disclosure

This disclosure generally relates to a portable wireless device solution that utilizes machine and input/output (I/O) virtualization techniques to defeat spying attacks against general-purpose operating systems that commonly control portable wireless systems.

2. General Background

As portable wireless devices—such as smartphones, tablets, automotive infotainment systems, and so-called "Internet of Things" sensor-based devices—gain in popularity and use, they are increasingly being targeted by cyber attackers, who use device wireless communications pathways to launch remote attacks against the device's operating system. Many such operating systems, for example, iOS, Linux, Windows, and Android, are extremely complicated and have a lengthy track record of containing numerous exploitable security vulnerabilities. One family of attack vectors attempts to surreptitiously activate the portable device's input peripherals—such as audio, wireless communications (Wi-Fi, Bluetooth, etc.), and cameras—to gather locally available/generated private information without proper authorization (i.e. spy).

Portable device operating systems employ a number of security controls aimed at preventing unauthorized manipulation of input peripherals; however, the vulnerabilities in the operating systems themselves may render such controls impotent, since an attacker can simply use one of these vulnerabilities to commandeer the operating system and disable or otherwise circumvent its security controls.

BRIEF DESCRIPTION OF THE DRAWINGS

By way of example, reference will now be made to the accompanying drawings.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to specific implementations of the present invention as illustrated in the accompanying drawings. The same reference numbers will be used throughout the drawings and the following description to refer to the same or like parts.

Further, certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement aspects of the present invention. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of functions.

The term "machine-readable medium" should be understood to include any structure that participates in providing data which may be read by an element of a computer system. Such a medium may take many forms, including but not limited to, non-volatile media, volatile media, and transmission media. Non-volatile media include, for example, optical or magnetic disks and other persistent memory. Volatile media include dynamic random access memory (DRAM) and/or static random access memory (SRAM). Transmission media include cables, wires, and fibers, including the wires that comprise a system bus coupled to processor. Common forms of machine-readable media include, for example, a floppy disk, a flexible disk, a hard disk, a magnetic tape, any other magnetic medium, a CD-ROM, a DVD, any other optical medium.

Figure 1:
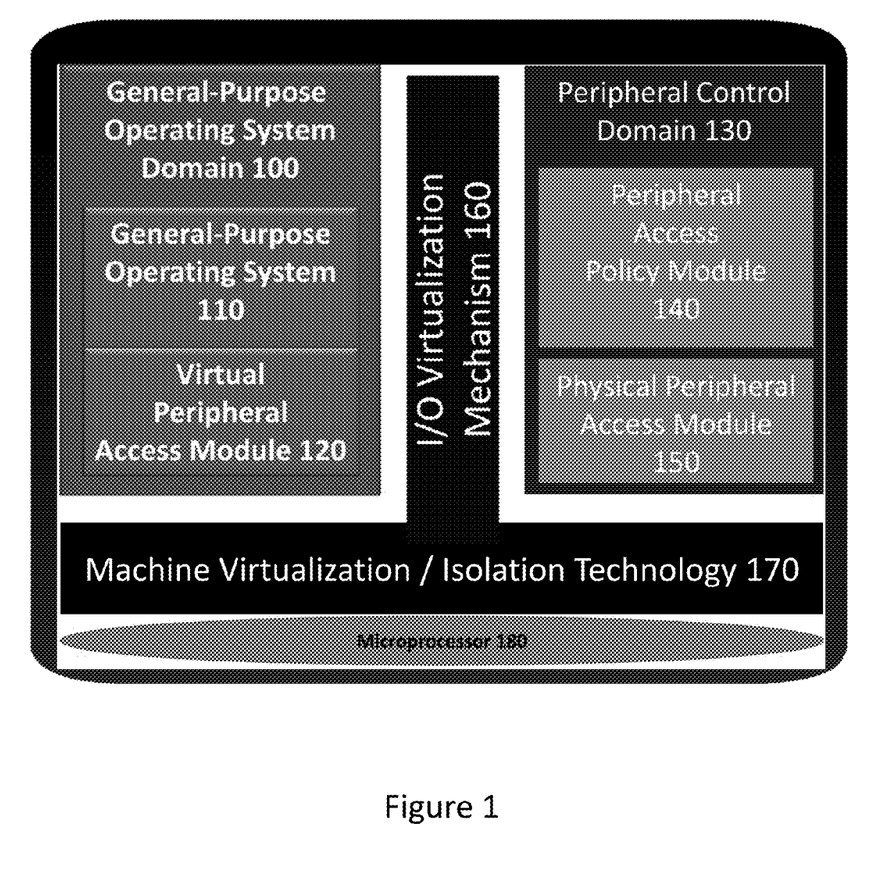
FIG. 1 illustrates a block diagram of a computing device employing virtualization techniques in accordance with certain embodiments.

As shown in FIG. 1, certain embodiments employ an "out-of-band" mechanism in which the physical controls for activating input peripherals are removed from the portable device operating system domain 100 and placed instead under the control of a separate peripheral control domain 130, isolated from the general-purpose operating system domain 100 by a machine virtualization/isolation technology 170. The machine virtualization/isolation technology 170 may employ machine virtualization techniques that enable the peripheral control domain 130 to run alongside, but securely isolated from the general-purpose portable operating system 110 on the same general-purpose microprocessor 180 that would be used in a system that lacks the above features. No additional hardware may be required to implement the foregoing embodiments. An adjunct I/O virtualization mechanism 160 may also be included to abstract the guarded input peripheral interfaces, such that all attempts to turn them on from within the general-purpose operating system 110 are automatically redirected by the I/O virtualization mechanism 160 to the peripheral control domain 130. The peripheral control domain 130 may then conduct a policy-driven decision process via peripheral access policy module 140 to either allow, disallow, or request manual/explicit authorization of these access attempts. If access is permitted, such physical access may be performed by physical peripheral access module 150 within the peripheral control domain 130 and not within the general-purpose operating system domain 100. Because the access control and physical activation of input peripherals occur out-of-band from the operating system 100, these security-critical operations may be immune to vulnerabilities in the portable operating system 100.

In certain embodiments, the I/O manipulation mechanisms described in this disclosure do not impact the user experience; nothing in the user interface or in the behavior of general-purpose operating system application software is changed.

In certain embodiments, a portable computing device is disclosed comprising: at least one portable operating system domain; a peripheral control domain; a machine virtualization mechanism that isolates the at least one operating system domain from the peripheral control domain; and an I/O virtualization mechanism configured to be interposed between the operating system domain and the peripheral control domain and configured to translate operating system-originated input peripheral access requests and responses. The peripheral control domain may comprise: a physical peripheral control component; and a policy component for deciding how to handle input peripheral requests originating from the operating system. The machine virtualization mechanism may comprise a Type-1 hypervisor. The machine virtualization mechanism may comprise a Type-2 hypervisor. The machine virtualization mechanism may utilize ARM TrustZone. The machine virtualization mechanism may comprise a microkernel. The machine virtualization mechanism may comprise a separation kernel. The policy component may be configured to perform a local, autonomous decision regarding whether to allow input peripheral access based at least in part on at least one detectable condition. The at least one detectable condition may comprise at least one of a geolocation, one or more fixed policy settings, and an active connection to a trusted network. The policy component may be configured to request a user input to grant permission to access the input peripheral and the machine virtualization mechanism may be configured to render the portable operating system unable to overwrite or corrupt the input request process if the user input does not grant access. The policy component may receive a decision from a remote system. The remote system may comprise one of a manual control system or an automated control system. The policy component may record in an audit log all attempts to access input peripherals. The audit log may be locally stored within the portable device. The audit log may be transmitted to the remote system. The device may further comprise an input/data generation peripheral comprising at least one of: an audio device, a Bluetooth module, a near-field communications (NFC) module, a Wi-Fi module, a camera, a sensor, a global positioning system module, a ZigBee module and an IEEE 802.15.4 module. The I/O virtualization mechanism may comprise: one or more alternative virtualized controls that mimic one or more operating system peripheral controls for interfacing with the operating system. The I/O virtualization mechanism may comprise: a logical communications interface between the operating system domain and the peripheral control module domain for translating control requests and responses. The I/O virtualization mechanism may comprise at least one microprocessor trap to detect an attempt to access at least one physical peripheral. The machine virtualization mechanism may be configured to transfer control to the peripheral control module based on the detected attempt.

In certain embodiments, a portable computing device is disclosed comprising: at least one portable operating system module; a peripheral control module; a machine virtualization module that isolates the at least one operating system module from the peripheral control module; and an I/O virtualization module interposed between the operating system module and the peripheral control module and configured to translate operating system-originated input peripheral access requests and responses. The peripheral control module may comprise: a physical peripheral control module; and a policy module for deciding how to handle input peripheral requests originating from the operating system module. The machine virtualization module may comprise a Type-1 hypervisor. The machine virtualization module may comprise a Type-2 hypervisor. The machine virtualization module may utilize ARM TrustZone. The machine virtualization module may comprise one of a microkernel and a separation kernel. The policy module may be configured to perform a local, autonomous decision regarding whether to allow input peripheral access based at least in part on at least one detectable condition. The at least one detectable condition may comprise at least one of a geolocation, one or more fixed policy settings, and an active connection to a trusted network. The policy module may be configured to request a user input to grant permission to access the input peripheral and the machine virtualization module may be configured to render the portable operating system unable to overwrite or corrupt the input request process if the user input does not grant access. The policy module may receive a decision from a remote system. The remote system may comprise one of a manual control system or an automated control system. The policy module may record in an audit log all attempts to access input peripherals. The audit log may be locally stored within the portable device. The audit log may be transmitted to the remote system. The device may further comprise an input/data generation peripheral comprising at least one of: an audio device, a Bluetooth module, a near-field communications (NFC) module, a Wi-Fi module, a camera, a sensor, a global positioning system module, a ZigBee module and an IEEE 802.15.4 module. The I/O virtualization module may comprise: one or more alternative virtualized controls that mimic one or more operating system peripheral controls for interfacing to the operating system. The I/O virtualization module may comprise: a logical communications interface between the operating system module and the peripheral control module for translating control requests and responses. The I/O virtualization module may comprise at least one microprocessor trap to detect an attempt to access physical peripherals. The machine virtualization module may be configured to transfer control to the peripheral control module based on the detected attempt.

In certain embodiments, a method of domain isolation is disclosed, comprising: receiving an input peripheral access request from at least one portable device operating system; and performing a local, autonomous decision whether to allow input peripheral access based at least in part on at least one detectable condition, wherein the at least one portable device operating system is isolated from a peripheral access module domain by a machine virtualization module. The peripheral access module domain may comprise: a physical peripheral control module; and a policy module for deciding how to handle input peripheral requests originating from the operating system. The machine virtualization module may comprise a Type-1 hypervisor. The machine virtualization module may comprise a Type-2 hypervisor. The machine virtualization module may utilize ARM TrustZone. The machine virtualization module may comprise a microkernel or may comprise a separation kernel. The at least one detectable condition may comprise at least one of a geolocation, one or more fixed policy settings, and an active connection to a trusted network. The method may further comprise: requesting a user input whether to allow the input peripheral access; and selectively permitting access to the input peripheral based at least in part on the user input. Selectively permitting access may comprise rendering the operating system unable to overwrite the input request process if the user input does not provide permission to access the input peripheral. The method may further comprise: providing one or more alternative virtualized peripheral controls that mimic one or more operating system peripheral controls for interfacing to the operating system. The method may further comprise: translating at least one control request and at least one response via a logical communications interface between the operating system domain and the peripheral control module domain. The method may further comprise: detecting an attempt to access at least one physical peripheral; and transferring control of the at least one physical peripheral to the peripheral access module domain.

In certain embodiments, the machine virtualization mechanism may inform a local user of the input peripheral access attempt and request approval by using a dialog box on the portable device touch screen. This graphical interface may run on the machine virtualization mechanism (within the peripheral control domain or yet another domain isolated from the general-purpose operating system domain) and the entire display and touch input system may be virtualized so that this authorization interaction also occurs out-of-band from the portable operating system and may therefore be immune to its vulnerabilities.

In certain embodiments, a portable computing device is disclosed including: at least one portable operating system domain; a peripheral control domain comprising a policy component for detecting and responding to an unauthorized attempt to activate an input peripheral; a machine virtualization mechanism that isolates the at least one operating system domain from the peripheral control domain; and an I/O virtualization mechanism configured to be interposed between the operating system domain and the peripheral control domain and configured to translate operating system-originated input peripheral access requests and responses. The policy component may be configured to detect an unauthorized attempt by detecting an attempt to access an input peripheral when the device is in a lower power state. The policy component may be configured to detect an attempt to access an input peripheral when a user screen is blanked. The policy component may be configured to detect an attempt to access an input peripheral by an operating system component or application that is not on a white list of permitted activators of the input peripheral. The policy component may be configured to detect an attempt to access an input peripheral when the device is in a geolocation not approved for use of the peripheral. The policy component may be configured to consult a remote server for a decision whether to permit access to an input peripheral when access to the input peripheral is detected. The policy component may be configured to activate an alarm when an unauthorized attempt to activate an input peripheral is detected. The machine virtualization mechanism may include a Type-1 hypervisor. The machine virtualization mechanism may include a Type-2 hypervisor. The machine virtualization mechanism may utilize ARM TrustZone. The machine virtualization mechanism may include a microkernel. The machine virtualization mechanism may include a separation kernel. The policy component may be configured to perform a local, autonomous decision regarding whether to allow input peripheral access based at least in part on at least one detectable condition. The at least one detectable condition may include at least one of a geolocation, one or more fixed policy settings, and an active connection to a trusted network. The policy component may be configured to request a user input to grant permission to access the input peripheral and the machine virtualization mechanism is configured to render the portable operating system unable to overwrite or corrupt the input request process if the user input does not grant access. The machine virtualization mechanism may be configured to render the portable operating system unable to overwrite or corrupt the input request process in response to detection of an unauthorized attempt to access an input peripheral. The policy component may receive a decision from a remote system. The remote system may comprise one of a manual control system or an automated control system. The policy component may record in an audit log all attempts to access input peripherals. The audit log may be locally stored within the portable device. The audit log may be transmitted to the remote system. The device may further include an input/data generation peripheral comprising at least one of: an audio device, a Bluetooth module, a near-field communications (NFC) module, a Wi-Fi module, a camera, a sensor, a global positioning system module, a ZigBee module and an IEEE 802.15.4 module. The I/O virtualization mechanism may include one or more alternative virtualized controls that mimic one or more operating system peripheral controls for interfacing with the operating system. The I/O virtualization mechanism may include a logical communications interface between the operating system domain and the peripheral control module domain for translating control requests and responses. The I/O virtualization mechanism may include at least one microprocessor trap to detect an attempt to access at least one physical peripheral. The machine virtualization mechanism may be configured to transfer control to the peripheral control module based on the detected attempt.

In certain embodiments, a portable computing device is disclosed including: at least one portable operating system module; a peripheral control module comprising a policy module for detecting and responding to an unauthorized attempt to activate an input peripheral; a machine virtualization module that isolates the at least one operating system module from the peripheral control module; and an I/O virtualization module interposed between the operating system module and the peripheral control module and configured to translate operating system-originated input peripheral access requests and responses. The policy module may be configured to detect an attempt to access an input peripheral when the device is in a lower power state. The policy module may be configured to detect an attempt to access an input peripheral when a user screen is blanked. The policy module may be configured to detect an attempt to access an input peripheral by an operating system component or application that is not on a white list of permitted activators of the input peripheral. The policy module may be configured to detect an attempt to access an input peripheral when the device is in a geolocation not approved for use of the peripheral. The policy module may be configured to consult a remote server for a decision whether to permit access to an input peripheral when access to the input peripheral is detected. The policy module may be configured to activate an alarm when an unauthorized attempt to activate an input peripheral is detected. The machine virtualization module may include a Type-1 hypervisor. The machine virtualization module may include a Type-2 hypervisor. The machine virtualization module may utilize ARM TrustZone. The machine virtualization module may include one of a microkernel and a separation kernel. The policy module may be configured to perform a local, autonomous decision regarding whether to allow input peripheral access based at least in part on at least one detectable condition. The at least one detectable condition may include at least one of a geolocation, one or more fixed policy settings, and an active connection to a trusted network. The policy module may be configured to request a user input to grant permission to access the input peripheral and the machine virtualization module is configured to render the portable operating system unable to overwrite or corrupt the input request process if the user input does not grant access. The machine virtualization mechanism may be configured to render the portable operating system unable to overwrite or corrupt the input request process in response to detection of an unauthorized attempt to access an input peripheral. The policy module may receive a decision from a remote system. The remote system may include one of a manual control system or an automated control system. The policy module may record in an audit log all attempts to access input peripherals. The audit log may be locally stored within the portable device. The audit log may be transmitted to the remote system. The device may further include an input/data generation peripheral comprising at least one of: an audio device, a Bluetooth module, a near-field communications (NFC) module, a Wi-Fi module, a camera, a sensor, a global positioning system module, a ZigBee module and an IEEE 802.15.4 module. The I/O virtualization module may include one or more alternative virtualized controls that mimic one or more operating system peripheral controls for interfacing to the operating system. The I/O virtualization module may include a logical communications interface between the operating system module and the peripheral control module for translating control requests and responses. The I/O virtualization module may include at least one microprocessor trap to detect an attempt to access physical peripherals. The machine virtualization module may be configured to transfer control to the peripheral control module based on the detected attempt.

In certain embodiments, a method of domain isolation is disclosed, including: receiving an input peripheral access request from at least one portable device operating system; determining if the request is an unauthorized attempt to activate an input peripheral; executing a protective response if the request is determined to be an unauthorized attempt to activate an input peripheral; wherein the at least one portable device operating system is isolated from a peripheral access module domain by a machine virtualization module and wherein the steps of determining and executing are performed in the peripheral access domain. The peripheral access module domain may include a policy module for deciding how to respond to peripheral requests originating from the operating system. The machine virtualization module may include a Type-1 hypervisor. The machine virtualization module may include a Type-2 hypervisor. The machine virtualization module may utilize ARM TrustZone. The machine virtualization module may include one of a microkernel and a separation kernel. The machine virtualization module may include a Type-1 hypervisor. The machine virtualization module may include a Type-2 hypervisor. The machine virtualization module may utilize ARM TrustZone. The machine virtualization module may include one of a microkernel and a separation kernel. The step of determining may be based at least in part on at least one detectable condition selected from a geolocation, one or more fixed policy settings, and an active connection to a trusted network. The method may further include: requesting a user input whether to allow the input peripheral access; and selectively permitting access to the input peripheral based at least in part on the user input. Selectively permitting access may include rendering the operating system unable to overwrite the input request process if the user input does not provide permission to access the input peripheral. The step of determining may include detecting an attempt to access an input peripheral when the device is in a lower power state. The step of determining may include detecting an attempt to access an input peripheral when a user screen is blanked. The step of determining may include detecting an attempt to access an input peripheral by an operating system component or application that is not on a white list of permitted activators of the input peripheral. The step of determining may include detecting an attempt to access an input peripheral when the device is in a geolocation not approved for use of the peripheral. The method may further include consulting a remote server for a decision whether to permit access to an input peripheral when access to the input peripheral is detected. The step of executing a protective response may include activating an alarm when an unauthorized attempt to activate an input peripheral is detected. The step of executing a protective response may include rendering the operating system unable to overwrite the input request process if the user input does not provide permission to access the input peripheral. The step of executing a protective response may include logging the attempt locally. The step of executing a protective response may include logging the attempt remotely. The step of executing a protective response may include an audible alarm. The step of executing a protective response may include halting the operating system. The step of executing a protective response may include rendering the operating system inoperable. The step of executing a protective response may include a data wipe. The method may further include providing one or more alternative virtualized controls that mimic one or more operating system peripheral controls for interfacing to the operating system. The method may further include translating at least one control request and at least one response via a logical communications interface between the operating system domain and the peripheral control module domain. The method may further include: detecting an attempt to access at least one physical peripheral; and transferring control of the at least one physical peripheral to the peripheral access module domain.

Figure 2:
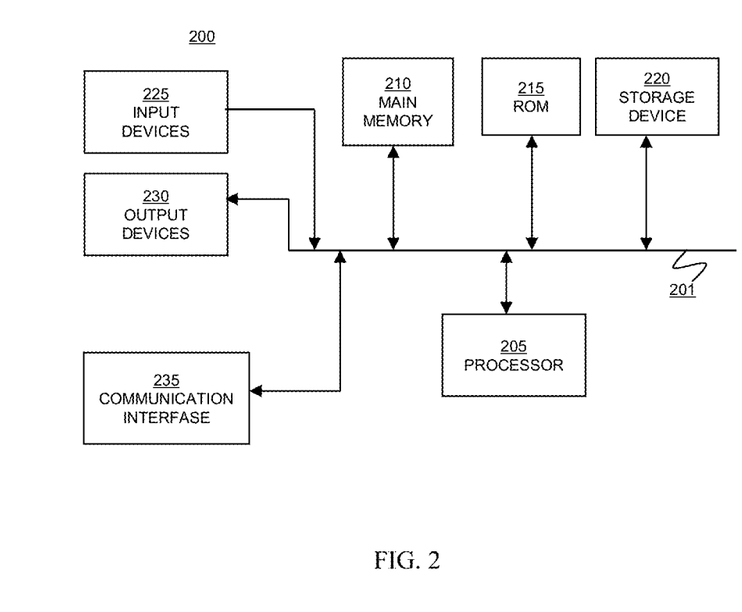
FIG. 2 is an exemplary block diagram of a computing device that may be used to implement aspects of certain embodiments of the present invention.

FIG. 2 is an exemplary diagram of a computing device 200 that may be used to implement aspects of certain embodiments of the present invention. Computing device 200 may include a bus 201, one or more processors 205, a main memory 210, a read-only memory (ROM) 215, a storage device 220, one or more input devices 225, one or more output devices 230, and a communication interface 235. Bus 201 may include one or more conductors that permit communication among the components of computing device 200.

Processor 205 may include any type of conventional processor, microprocessor, or processing logic that interprets and executes instructions. Main memory 210 may include a random-access memory (RAM) or another type of dynamic storage device that stores information and instructions for execution by processor 205. ROM 215 may include a conventional ROM device or another type of static storage device that stores static information and instructions for use by processor 205. Storage device 220 may include a magnetic and/or optical recording medium and its corresponding drive.

Input device(s) 225 may include one or more conventional mechanisms that permit a user to input information to computing device 200, such as a keyboard, a mouse, a pen, a stylus, handwriting recognition, voice recognition, biometric mechanisms, and the like. Output device(s) 230 may include one or more conventional mechanisms that output information to the user, including a display, a projector, an A/V receiver, a printer, a speaker, and the like. Communication interface 235 may include any transceiver-like mechanism that enables computing device/server 200 to communicate with other devices and/or systems. For example, communication interface 235 may include mechanisms for communicating with another device or system via a network.

As described in detail above, computing device 200 may perform operations based on software instructions that may be read into memory 210 from another computer-readable medium, such as data storage device 220, or from another device via communication interface 235. The software instructions contained in memory 210 cause processor 205 to perform processes described herein. Alternatively, hard-wired circuitry may be used in place of or in combination with software instructions to implement processes consistent with the present invention. Thus, various implementations are not limited to any specific combination of hardware circuitry and software.

A web browser comprising a web browser user interface may be used to display information (such as textual and graphical information) on the computing device 200. The web browser may comprise any type of visual display capable of displaying information received via a network, such as Microsoft's Internet Explorer browser, Netscape's Navigator browser, Mozilla's Firefox browser, PalmSource's Web Browser, Google's Chrome browser or any other commercially available or customized browsing or other application software capable of communicating with the network. The computing device 200 may also include a browser assistant. The browser assistant may include a plug-in, an applet, a dynamic link library (DLL), or a similar executable object or process. Further, the browser assistant may be a toolbar, software button, or menu that provides an extension to the web browser. Alternatively, the browser assistant may be a part of the web browser, in which case the browser would implement the functionality of the browser assistant.

The browser and/or the browser assistant may act as an intermediary between the user and the computing device 200 and/or the network. For example, source data or other information received from devices connected to the network may be output via the browser. Also, both the browser and the browser assistant are capable of performing operations on the received source information prior to outputting the source information. Further, the browser and/or the browser assistant may receive user input and transmit the inputted data to devices connected to the network.

Similarly, certain embodiments of the present invention described herein are discussed in the context of the global data communication network commonly referred to as the Internet. Those skilled in the art will realize that embodiments of the present invention may use any other suitable data communication network, including without limitation direct point-to-point data communication systems, dial-up networks, personal or corporate Intranets, proprietary networks, or combinations of any of these with or without connections to the Internet.

While the above description contains many specifics, these should not be construed as limitations on the scope of the invention, but rather as an exemplification of certain embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A portable computing device comprising:
   an out-of-band mechanism for activating input peripherals from a peripheral control domain separate from a portable operating system domain;
   a microprocessor;
   at least one portable operating system domain;
   a peripheral control domain comprising a policy component for detecting and responding to an unauthorized attempt to activate an input peripheral;
   a machine virtualization mechanism that isolates the at least one operating system domain from the peripheral control domain; and
   an Input/Output (I/O) virtualization mechanism configured to be interposed between the operating system domain and the peripheral control domain and configured to translate operating system-originated input peripheral access requests and responses;
   wherein the policy component is configured to detect an unauthorized attempt by detecting at least one of (1) an attempt to access an input peripheral when the device is in a lower power state or (2) an attempt to access an input peripheral when a user screen is blanked.

2. The device of claim 1, wherein the policy component is configured to detect an attempt to access an input peripheral by an operating system component or application that is not on a white list of permitted activators of the input peripheral.

3. The device of claim 1, wherein the policy component is configured to detect an attempt to access an input peripheral when the device is in a geolocation not approved for use of the peripheral.

4. The device of claim 1, wherein the policy component is configured to consult a remote server for a decision whether to permit access to an input peripheral when access to the input peripheral is detected.

5. The device of claim 1, wherein the policy component is configured to activate an alarm when an unauthorized attempt to activate an input peripheral is detected.

6. The device of claim 1, wherein the machine virtualization mechanism comprises a Type-1 hypervisor.

7. The device of claim 1, wherein the machine virtualization mechanism comprises a Type-2 hypervisor.

8. The device of claim 1, wherein the machine virtualization mechanism utilizes a plurality of virtual processors backed by hardware based access control.

9. The device of claim 1, wherein the machine virtualization mechanism comprises a microkernel.

10. The device of claim 1, wherein the machine virtualization mechanism comprises a separation kernel.

11. The device of claim 1, wherein the policy component is configured to perform a local, autonomous decision regarding whether to allow input peripheral access based at least in part on at least one detectable condition.

12. The device of claim 11, wherein the at least one detectable condition comprises at least one of a geolocation, one or more fixed policy setting, and an active connection to a trusted network.

13. The device of claim 1, wherein the policy component is configured to request a user input to grant permission to access the input peripheral and the machine virtualization mechanism is configured to render the portable operating system unable to overwrite or corrupt the input request process if the user input does not grant access.

14. The device of claim 1, wherein the machine virtualization mechanism is configured to render the portable operating system unable to overwrite or corrupt the input request process in response to detection of an unauthorized attempt to access an input peripheral.

15. The device of claim 1, wherein the policy component receives a decision from a remote system.

16. The device of claim 15, wherein the remote system comprises one of a manual control system or an automated control system.

17. The device of claim 15, wherein the policy component records in an audit log all attempts to access input peripherals.

18. The device of claim 17, wherein the audit log can be locally stored within the portable device.

19. The device of claim 17, wherein the audit log can be transmitted to the remote system.

20. The device of claim 1, further comprising an input/data generation peripheral comprising at least one of: an audio device, a wireless communications module, a near-field communications (NFC) module, a camera, a sensor, and a global positioning system module.

21. The device of claim 1, wherein the I/O virtualization mechanism comprises: one or more alternative virtualized controls that mimic one or more operating system peripheral controls for interfacing with the operating system.

22. The device of claim 1, wherein the I/O virtualization mechanism comprises: a logical communications interface between the operating system domain and the peripheral control module domain for translating control requests and responses.

23. The device of claim 1, wherein the I/O virtualization mechanism comprises at least one microprocessor trap to detect an attempt to access at least one physical peripheral.

24. The device of claim 23, wherein the machine virtualization mechanism is configured to transfer control to the peripheral control module based on the detected attempt.

25. A portable computing device comprising:
an out-of-band mechanism for activating input peripherals from a peripheral control module separate from a portable operating system module;
at least one portable operating system module;
a peripheral control module comprising a policy module for detecting and responding to an unauthorized attempt to activate an input peripheral;
a machine virtualization module that isolates the at least one operating system module from the peripheral control module; and
an Input/Output (I/O) virtualization module interposed between the operating system module and the peripheral control module and configured to translate operating system-originated input peripheral access requests and responses;
wherein the modules are executed by at least one microprocessor;
wherein the policy module is configured to detect at least one of (1) an attempt to access an input peripheral when the device is in a lower power state or (2) an attempt to access an input peripheral when a user screen is blanked.

26. The device of claim 25, wherein the policy module is configured to detect an attempt to access an input peripheral by an operating system component or application that is not on a white list of permitted activators of the input peripheral.

27. The device of claim 25, wherein the policy module is configured to detect an attempt to access an input peripheral when the device is in a geolocation not approved for use of the peripheral.

28. The device of claim 25, wherein the policy module is configured to consult a remote server for a decision whether to permit access to an input peripheral when access to the input peripheral is detected.

29. The device of claim 25, wherein the policy module is configured to activate an alarm when an unauthorized attempt to activate an input peripheral is detected.

30. The device of claim 25, wherein the machine virtualization module comprises a Type-1 hypervisor.

31. The device of claim 25, wherein the machine virtualization module comprises a Type-2 hypervisor.

32. The device of claim 25, wherein the machine virtualization module utilizes a plurality of virtual processors backed by hardware based access control.

33. The device of claim 25, wherein the machine virtualization module comprises one of a microkernel and a separation kernel.

34. The device of claim 25, wherein the policy module is configured to perform a local, autonomous decision regarding whether to allow input peripheral access based at least in part on at least one detectable condition.

35. The device of claim 34, wherein the at least one detectable condition comprises at least one of a geolocation, one or more fixed policy settings, and an active connection to a trusted network.

36. The device of claim 25, wherein the policy module is configured to request a user input to grant permission to access the input peripheral and the machine virtualization module is configured to render the portable operating system unable to overwrite or corrupt the input request process if the user input does not grant access.

37. The device of claim 25, wherein the machine virtualization mechanism is configured to render the portable operating system unable to overwrite or corrupt the input request process in response to detection of an unauthorized attempt to access an input peripheral.

38. The device of claim 25, wherein the policy module receives a decision from a remote system.

39. The device of claim 25, wherein the remote system comprises one of a manual control system or an automated control system.

40. The device of claim 25, wherein the policy module records in an audit log all attempts to access input peripherals.

41. The device of claim 40, wherein the audit log can be locally stored within the portable device.

42. The device of claim 40, wherein the audit log can be transmitted to the remote system.

43. The device of claim 25, further comprising an input/data generation peripheral comprising at least one of: an audio device, a wireless communications module, a near-field communications (NFC) module, a camera, a sensor, and a global positioning system module.

44. The device of claim 25, wherein the I/O virtualization module comprises: one or more alternative virtualized controls that mimic one or more operating system peripheral controls for interfacing to the operating system.

45. The device of claim 25, wherein the I/O virtualization module comprises: a logical communications interface between the operating system module and the peripheral control module for translating control requests and responses.

46. The device of claim 25, wherein the I/O virtualization module comprises at least one microprocessor trap to detect an attempt to access physical peripherals.

47. The device of claim 46, wherein the machine virtualization module is configured to transfer control to the peripheral control module based on the detected attempt.

48. A method of domain isolation, comprising:
receiving an input peripheral access request from at least one portable device operating system;
determining if the request is an unauthorized attempt to activate an input peripheral; and
executing a protective response if the request is determined to be an unauthorized attempt to activate an input peripheral;
wherein the at least one portable device operating system is isolated from a peripheral access module domain by a out-of-band machine virtualization module and wherein the steps of determining and executing are performed in the peripheral access domain;
wherein the unauthorized attempt to activate an input peripheral comprises at least one of (1) an attempt to access an input peripheral when the device is in a lower power state or (2) an attempt to access an input peripheral when a user screen is blanked.

49. The method of claim 48, wherein peripheral access module domain comprises a policy module for deciding how to respond to peripheral requests originating from the operating system.

50. The method of claim 48, wherein the machine virtualization module comprises a Type-1 hypervisor.

51. The method of claim 48, wherein the machine virtualization module comprises a Type-2 hypervisor.

52. The method of claim 48, wherein the machine virtualization module utilizes a plurality of virtual processors backed by hardware based access control.

53. The method of claim 48, wherein the machine virtualization module comprises one of a microkernel and a separation kernel.

54. The method of claim 49, wherein the machine virtualization module comprises a Type-1 hypervisor.

55. The method of claim 49, wherein the machine virtualization module comprises a Type-2 hypervisor.

56. The method of claim 49, wherein the machine virtualization module utilizes a plurality of virtual processors backed by hardware based access control.

57. The method of claim 49, wherein the machine virtualization module comprises one of a microkernel and a separation kernel.

58. The method of claim 48, wherein the step of determining is based at least in part on at least one detectable condition selected from a geolocation, one or more fixed policy settings, and an active connection to a trusted network.

59. The method of claim 48, further comprising: requesting a user input whether to allow the input peripheral access; and selectively permitting access to the input peripheral based at least in part on the user input.

60. The method of claim 59, wherein selectively permitting access comprises rendering the operating system unable to overwrite the input request process if the user input does not provide permission to access the input peripheral.

61. The method of claim 48, wherein the step of determining comprises detecting an attempt to access an input peripheral when the device is in a lower power state.

62. The method of claim 48, wherein the step of determining comprises detecting an attempt to access an input peripheral when a user screen is blanked.

63. The method of claim 48, wherein the step of determining comprises detecting an attempt to access an input peripheral by an operating system component or application that is not on a white list of permitted activators of the input peripheral.

64. The method of claim 48, wherein the step of determining comprises detecting an attempt to access an input peripheral when the device is in a geolocation not approved for use of the peripheral.

65. The method of claim 48, further comprising consulting a remote server for a decision whether to permit access to an input peripheral when access to the input peripheral is detected.

66. The method of claim 48, wherein the step of executing a protective response comprises activating an alarm when an unauthorized attempt to activate an input peripheral is detected.

67. The method of claim 48, wherein the step of executing a protective response comprises rendering the operating system unable to overwrite the input request process if the user input does not provide permission to access the input peripheral.

68. The method of claim 48, wherein the step of executing a protective response comprises logging the attempt locally.

69. The method of claim 48, wherein the step of executing a protective response comprises logging the attempt remotely.

70. The method of claim 48, wherein the step of executing a protective response comprises an audible alarm.

71. The method of claim 48, wherein the step of executing a protective response comprises halting the operating system.

72. The method of claim 48, wherein the step of executing a protective response comprises rendering the operating system inoperable.

73. The method of claim 48, wherein the step of executing a protective response comprises a data wipe.

74. The method of claim 48, further comprising: providing one or more alternative virtualized controls that mimic one or more operating system peripheral controls for interfacing to the operating system.

75. The method of claim 48, further comprising: translating at least one control request and at least one response via a logical communications interface between the operating system domain and the peripheral control module domain.

76. The method of claim 48, further comprising: detecting an attempt to access at least one physical peripheral; and transferring control of the at least one physical peripheral to the peripheral access module domain.

* * * * *